US012181376B1

(12) United States Patent
Meyer

(10) Patent No.: US 12,181,376 B1
(45) Date of Patent: Dec. 31, 2024

(54) SKID MOUNTED COMPRESSED NATURAL GAS (CNG) METERING AND REGULATION STATION HAVING IR AND UV GAS LEAK DETECTION

(71) Applicant: Roger J. Meyer, Hudsonville, MI (US)

(72) Inventor: Roger J. Meyer, Hudsonville, MI (US)

(73) Assignee: Preview Consultants, LLC, Hudsonville, MI (US)

( * ) Notice: Subject to any disclaimer, the term of this patent is extended or adjusted under 35 U.S.C. 154(b) by 0 days.

(21) Appl. No.: 18/300,299

(22) Filed: Apr. 13, 2023

Related U.S. Application Data

(63) Continuation-in-part of application No. 17/709,333, filed on Mar. 30, 2022, now abandoned.

(51) Int. Cl.
*G01M 3/38* (2006.01)
*E04B 1/343* (2006.01)
*G01F 15/18* (2006.01)
*G08B 21/16* (2006.01)

(52) U.S. Cl.
CPC ........... *G01M 3/38* (2013.01); *E04B 1/34336* (2013.01); *G01F 15/18* (2013.01); *G08B 21/16* (2013.01)

(58) Field of Classification Search
CPC ...... G07F 15/04; G01M 3/38; E04B 1/34336; E04B 1/34869; E04B 1/35; G01F 15/18; G08B 21/16; F16M 5/00
See application file for complete search history.

(56) References Cited

U.S. PATENT DOCUMENTS

| | | | | |
|---|---|---|---|---|
| 2,014,466 | A * | 9/1935 | Cheyney | F16M 5/00 248/632 |
| 4,467,585 | A * | 8/1984 | Busby | E04B 1/35 52/745.13 |
| 4,470,227 | A * | 9/1984 | Bigelow, Jr. | E04B 1/34869 52/234 |
| 2013/0194059 | A1* | 8/2013 | Parr | H02B 1/52 336/65 |
| 2019/0003918 | A1* | 1/2019 | Li | G01M 3/00 |
| 2019/0339159 | A1* | 11/2019 | Israelsen | G01M 3/38 |
| 2020/0109616 | A1* | 4/2020 | Oehring | F04B 23/06 |
| 2020/0391992 | A1* | 12/2020 | Bills | G07F 15/04 |
| 2021/0054837 | A1* | 2/2021 | Robbins | F04B 49/065 |
| 2021/0264584 | A1* | 8/2021 | Zhang | G06T 7/0004 |

FOREIGN PATENT DOCUMENTS

CN   207286075 U   *   5/2018
CN   216072878 U   *   3/2022

* cited by examiner

*Primary Examiner* — Michael J Dalbo
*Assistant Examiner* — Kaleria Knox
(74) *Attorney, Agent, or Firm* — Frank M. Scutch, III

(57) ABSTRACT

A compressed natural gas (CNG) metering and regulation station includes a primary skid frame comprised of a first plurality of steel members while a secondary skid frame is comprised of a second plurality of steel members that are reconfigurable using brackets for attaching to the first plurality of steel members. The station includes both infra-red (IR) and ultra-violet (UV) gas leak detect systems for detecting gas leaks. A roofed building extends over the primary skid frame and secondary skid frame. One or more lifting lug assemblies are used that extend through the roof of the building for providing lifting points for the CNG metering and regulation station building.

16 Claims, 6 Drawing Sheets

SKID MOUNTED COMPRESSED NATURAL GAS (CNG) METERING AND REGULATION STATION HAVING IR AND UV GAS LEAK DETECTION

FIELD OF THE INVENTION

The present invention relates generally to natural gas regulation and more particularly to a method for fabricating a skid mounted compressed natural gas (CNG) regulation station for use in replacement of an existing station.

BACKGROUND

Pressure regulation stations are well known in the art and typically consist of equipment installed for automatically reducing and regulating the pressure in the downstream pipeline or main to which it is connected. The regulation station includes both piping and auxiliary devices such as valves, control instruments, control lines, the enclosure, and ventilation equipment. Similarly, a pressure limiting station consist of equipment that under abnormal conditions will act to reduce, restrict, or shut off the supply of gas flowing into a system to prevent the gas pressure from exceeding a predetermined value. While normal pressure conditions prevail, the pressure limiting station may exercise some degree of control of the flow of the gas or may remain in the fully open position. Included in the station are piping and auxiliary devices, such as valves, control instruments, control lines, an enclosure, and ventilating equipment.

These stations need to be replaced at specific intervals because of safety concerns and age. Since portions of the piping in older stations is most often buried, this requires that some piping or other equipment be excavated from the ground and replaced with new piping and station components. The new piping and components are typically constructed on-site which can be slow, inefficient and introduces some quality concerns because of the precision welding that is involved. This can also cause issues with the environment and well as logistics in assembling a regulation station directly outdoors directly on-site.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
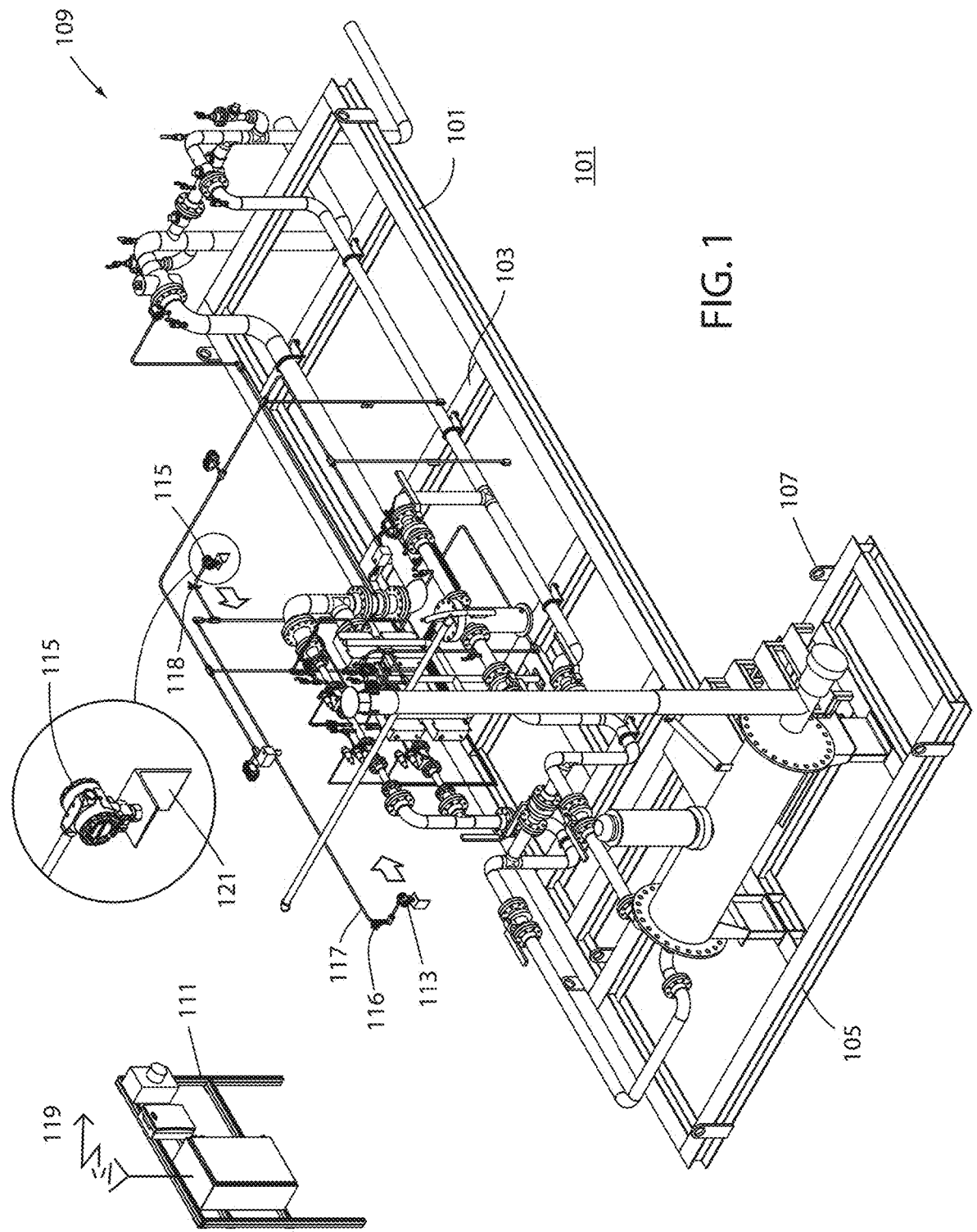
FIG. 1 is a perspective view illustrating a skid mounted compressed natural gas metering and regulation station having a visual leak detector.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a skid mounted compressed natural gas regulation station. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a perspective view illustrating a modular skid mounted CNG regulation station 100 that may be used in retro-fit type applications. As seen in FIG. 1, the various elements for providing regulation and metering are positioned on a skid for efficiency and to maintain balance for easy transport and installation. These elements include. but are not limited. to piping of various sizes, valves, mechanical and/or electronic metering and an optional heating unit. Each skid mounted CNG regulation station 100 is environmentally friendly and be fabricated off-site enabling installation costs to be greatly reduced. The regulation station 100 may also include odorant facilities and/or a heat exchanger-boiler as required. Sizes typically range from 100,000 BTU/hour to 15,000,000 BTU/hour with flow rates ranging from 100 MCFH to 15,000 MCFH.

The primary skid frame 101 in manufactured of structural steel for providing long stream strength and rigidity for supporting the tremendous weight of the regulation and metering components. The skid frame is typically configured in a linear, two-dimensional fashion such as in a square or rectangular pattern. The primary skid frame 101 includes one or more cross-members 103 for providing additional rigidity and strength. In situations where additional surface area is needed, a secondary skid frame 105 can be added to an end or side of the primary skid frame 101. In the example shown in FIG. 1, the secondary skid frame 105 is modular supporting a heater assembly at one end of the primary skid frame 101. In order to lift the assembled skid frame with a crane, a plurality of metallic looped eyelets 107 are used about the perimeter of the primary skid frame 101 and secondary skid frame 105 allowing it to be lifted into the air and positioned in a desired location. In order to allow the skid to be reconfigurable at a given location, the skid frame and cross-members 103 may include one or more brackets for allowing its overall shape to be easily adjusted, resized and/or reconfigured depending on geographical location or requirements for expansion at some later point in time. The primary skid frame 101 are secondary skid frame 105 are orthogonally attached to form a substantially L-shape and form a unitary skid assembly when joined. In use, values and piping 109 are uniquely configured on both the primary skid frame 103 and secondary skid frame 105. One or more metering stations 111 can be used to operate and control the use and control of CNG moving through the metering and regulation station 100. Each metering station includes at least one control valve 108 that can be wirelessly controlled and/or operated for metering and adjusting the flow of CNG though the piping 109.

The modular skid mounted CNG regulation station 100 includes a visual gas leak detector system for detecting breaches and leaks from piping or valves. The visual gas leak detector system includes two or more infra-red (IR) cameras 113, 115 that can be mounted to piping 117 as well as a UV light leakage detection system. The IR cameras 113, 115 are mounted, arranged and/or configured so to generally and/or substantially, directly face one another where they are used to detect leakage indicated by changes in ambient air temperature. Gases leaking from piping will alter ambient air temperature at the station. In other embodiments, the IR cameras 113, 115 can be mounted using at various orientations and/or elevations in order to provide maximum detection coverage area of gas leaks. In alternative embodiments, the IR camera's resolution or lens system can also be changed, or the mounted position of the camera, can be remotely rotated or otherwise moved, once changes in ambient air temperature are detected. These type methods may be used to assist in verification once a leak is detected at the station 100. Although two IR cameras are shown in this embodiment, those skilled in the art will recognize that a plurality of IR cameras may also be used as needed based on skid size and coverage requirements at various piping locations at the station.

Figure 1A:
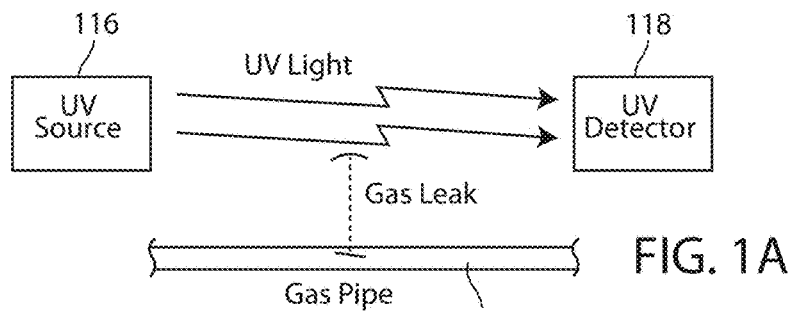
FIG. 1A is a perspective view showing operating of ultra-violet (UV) detection.

As seen in FIG. 1A, the skid also includes a UV light leakage detection system that uses an UV light source 116 and a UV detector 118. The UV light source 116 and UV detector 118 are configured in proximity to the high-pressure piping so in the event of a leak, a CNG gas cloud will occur in the ambient environment around the leak in pipe 120. The CNG cloud will reduce and/or attenuate the amount of UV light detected by the UV detector 118 from the UV light source 116. This reduction in amplitude or attenuation in UV light intensity is detected and coordinated with the IR detection system so to provide a redundancy in CNG leakage detection. Both systems viz. the temperature using the IR cameras 113, 115 or the UV light leakage detection system using the UV light source 116 using UV detector 118 can be used in a weighted decision-making process using a computer or other algorithmic methods to provide detection redundancy when determining when an actual leak has been detected. This decision-making process is used in-turn to turn off various control valves on the skid to prevent further leakage from the high pressure piping.

In use, both the IR cameras 113, 115 and UV detection system 116, 118 can be networked so to be wirelessly connected 119 to metering station 111 using Wi-Fi, Bluetooth, Zigbee or the like. The metering station 111 uses the IR cameras 113, 115 and UV system for detecting when a leak is present and can send a control signal to one or more control valve(s) 108 to turn-off the valve, stopping the leak and notifying appropriate repair and/or emergency personnel. The control signal can also alert a user to a leakage condition.

As seen in the magnified view, each IR camera 115 includes a mounting plate 121 for mounting to wall or other structural member. The visual gas leak detector system is useful in that gas leaks can be quickly extinguished by alerting the company or municipality to such a leak. The invention as described herein offers a high degree of safety when the station 100 is located at or near densely populated areas. Moreover, the invention allows the skid to be in compliance with new federal mandates to minimize gas leaks.

Figure 2:
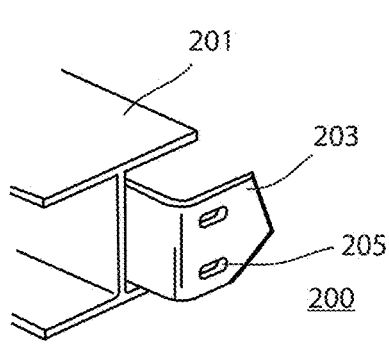
FIG. 2 is a perspective view of a skid mounting bracket according to an embodiment of the invention.

FIG. 2 is a perspective view of a skid mounting bracket assembly according to an embodiment of the invention. As seen in FIG. 2, the skid mounting bracket assembly 200 includes a right-angle bracket 203. The bracket 203 is attached so it extends orthogonally to at least one surface of the steel frame member 201. The bracket 203 may be shaped in a manner to have a flat or pointed sides to facilitate a better mounting surface. The bracket 203 further includes one or more elongated holes for 205 allowing mechanical fasteners such as screw and bolts to be used to hold the assembly into a fixed position.

Figure 3:
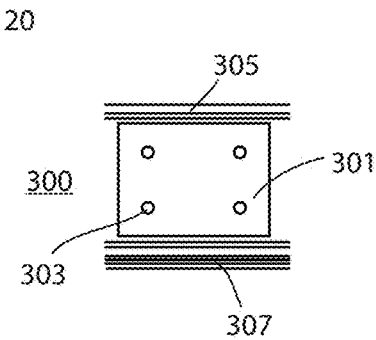
FIG. 3 is a side view showing the attachment point on the skid member for the skid mounting bracket showing in FIG. 2.

FIG. 3 is a side view illustrating the attachment point on the steel frame member for the skid mounting bracket showing in FIG. 2. The steel frame member 301 is shown with fastening holes 303 for receiving the skid mounting racket assembly shown in FIG. 2. In use, the bracket 203 will be appropriately sized so it can be positioned between the edges 305, 307 of the steel frame member 301. Since the skid mounting bracket will be held between edges 305, 307, this prevents movement and provides for a highly rigid structure when in its final assembled configuration.

Figure 4:
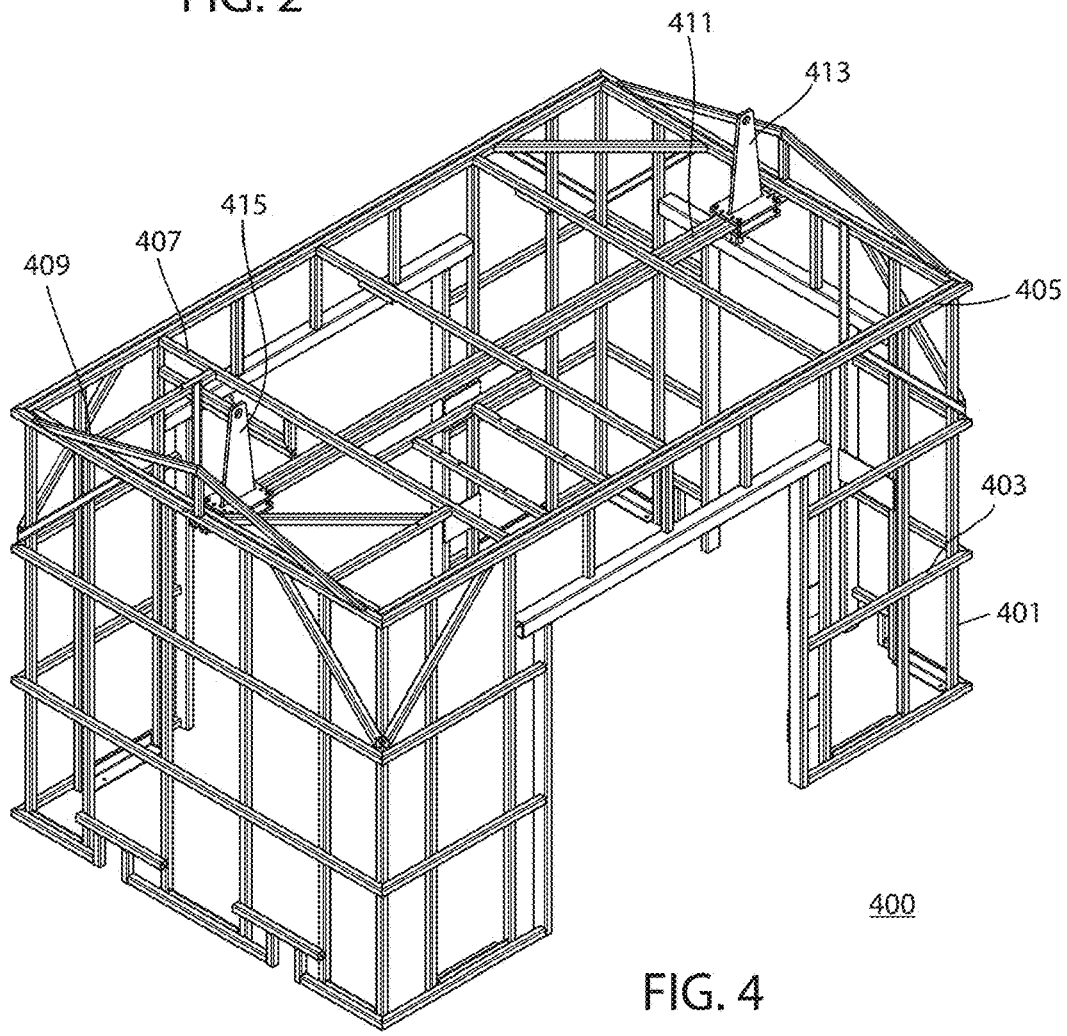
FIG. 4 is a perspective view showing the building used with the skid.

FIG. 4 is a perspective view showing the building used with the skid. The building 400 is typically manufactured of steel or aluminum members providing a rigid frame that can be covered in metallic sheeting, wood or other lightweight material. The building 400 includes a plurality of vertical studs 401 and cross-members 403 forming a box-like shape. A roof frame 405 tops the building 401 and includes joists 407 extending between the roof frame 405 to provide support. Rafters 409 allow the roof covering to be angled for deflecting rain, snow and other environmental elements. A ridge member 411 is centrally located extending substantially down the middle of the upper end of the roof frame 405. The roof member 411 is used to provide overall structural integrity to the building 400. In one embodiment, lifting lug assemblies 413, 415 are fastened at or near both ends of the ridge member 411 for allowing both the building and roof to be vertically lifted by a crane. This allows the entire metering and regulation station to be assembled off-site in a controlled manufacturing environment where it later can be easily positioned at any desired location. This allows for higher quality construction and lower overall costs to the customer.

Figure 5A:
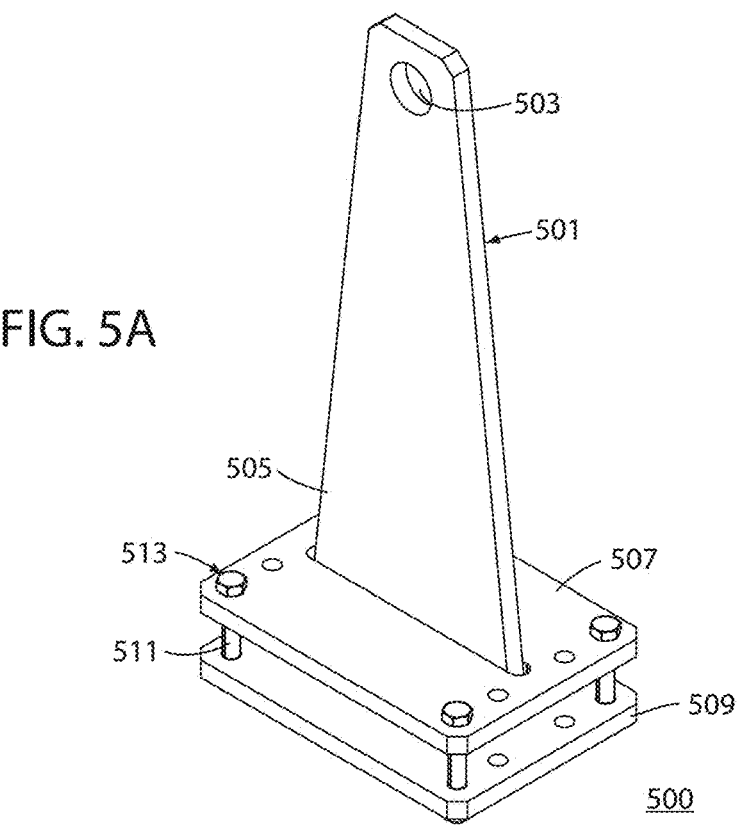
FIG. 5A and FIG. 5B are a perspective view and side view respectively illustrating lifting lug assembly used for raising and lowering the building on the CNG regulation station.
Figure 5B:
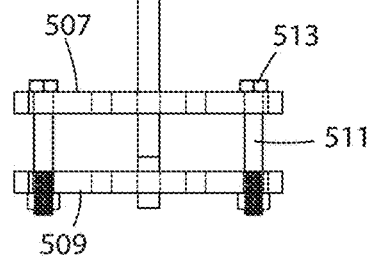

FIG. 5A and FIG. 5B are a perspective view and side view respectively illustrating a lifting lug assembly used for raising and lowering the building on the CNG regulation station. The lifting lug assembly 500 includes a trapezoidal shaped lug 501 having a lifting hole 503 at its distal end for attachment to a hook or other lifting mechanism. The trapezoidal shape has a unique profile allowing it to extend through the roof while preventing leakage and/or maintaining roof integrity. Those skilled in the art will further recognize that various shapes and sizes of the lifting lug assembly are possible for extending the lug through the roof of the building. Adequate surface area of the attachment lug is necessary as it extends through the roof for allowing hooks, cables and/or other lifting devices to be used by a crane to lift the load without damaging the roof. Although two lugs are shown by way of example, one or more lugs may be attached to the ridge member and/or at the four corners of the roof.

An upper base 507 and lower base 509 are used to support the lug 501. At its proximal end 505, the upper base 507 includes an oblong shaped hole for allowing the lug to extend therethrough before its attachment to a lower base 509. The upper base 507 and lower base 509 are separated by spacers 511. At each corner of the upper base 507 and lower base 509, screw fasteners 513 extend through the spacers 511 for joining the upper base 507 to the lower base 509 in a fixed relationship. The lug 501 is made of heavy steel construction allowing it to support the weight of the metering and regulation station 100 and building 400 when lifted into the air. As seen in FIG. 4, the arrangement of the upper base 507 and lower base 509 allow the lifting lug assembly 400 to be attached to the ridge member 411 extending between these the upper base 507 and lower base 509 for providing a strong supporting surface when the entire metering and regulation station building 400 is lifted.

Figure 6:
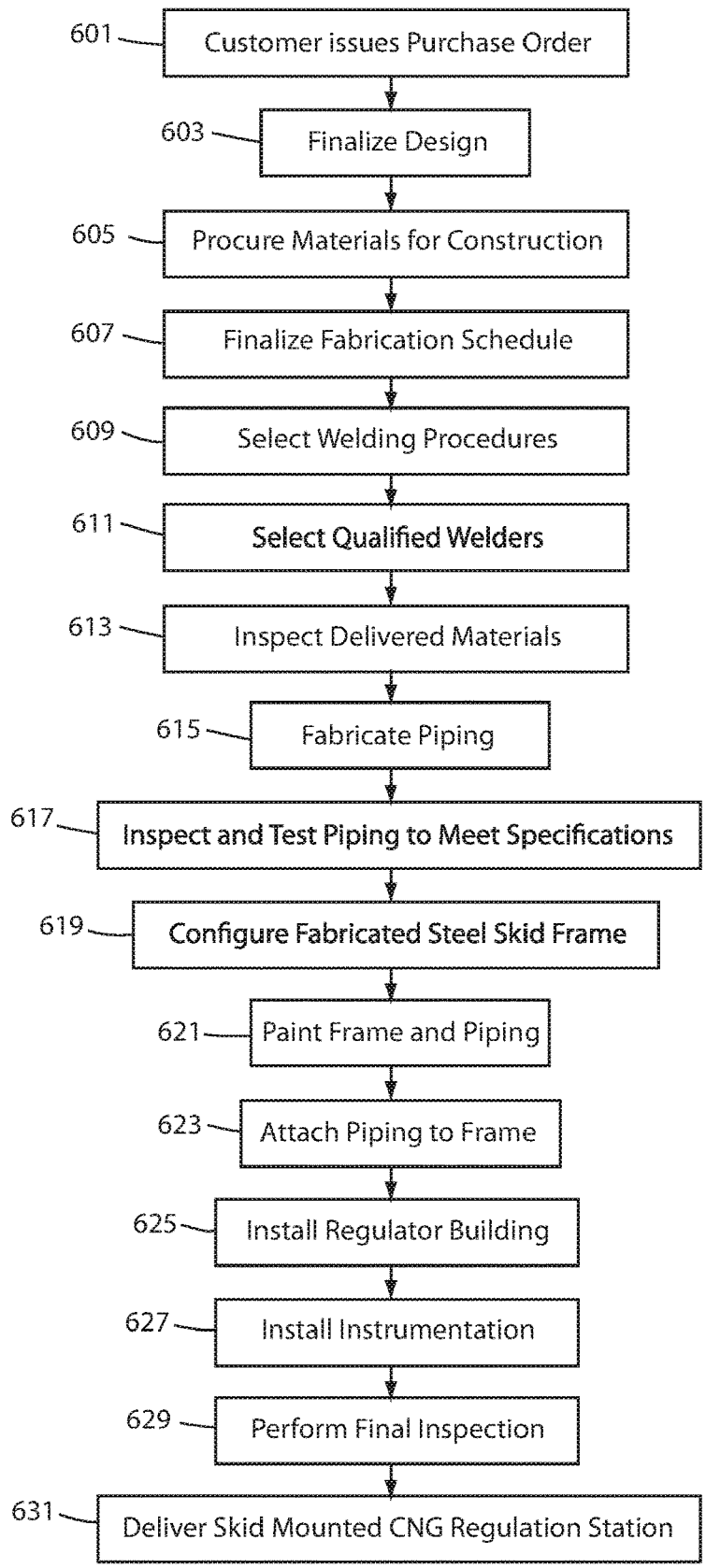
FIG. 6 is flow chart diagram illustrating the methods of manufacturing a skid mounted CNG regulation station.

FIG. 6 is flow chart diagram 600 illustrating the methods of manufacturing a skid mounted CNG regulation station applicable for use in retro-fit situations. Those skilled in the art will further recognize that these steps are not generally inclusive of field installation as installation will often vary based on site conditions and scope of work. With regard to FIG. 6, initially a purchase order (PO) is issued by a customer 601 for the purchase of the skid mounted CNG metering and regulation station. The design is finalized in working with the customer that may include specific and/or customized project needs regarding civil, structural, mechanical, and electrical requirements in the design 603.

Once the design of the CNG metering and regulations station is finalized, the procurement of all the require materials and hardware will commence 605. The material procurement is typically accomplished by the customer and/or a fabricator. If site dimensional tolerances are compact, the structural steel skid and associated regulator piping will be designed to fit within a footprint of approximately 210 ft$^2$. Additionally, if a heater skid is necessary to accommodate a gas/electric heating unit, the footprint needed may only be approximately 119 ft$^2$. Based on design and operability requirements of the customer, the structural steel skid can be configured in multiple variations and is compatible with different types of equipment. Those skilled in the art will recognize that various types of metering and/or regulation equipment can be installed on pre-fabricated structural steel skids for later attachment to a main regulator skid. Based on the ability to configure the skid in multiple variations by using structural steel, this allows the design to be easily adapted to meet future expansion requirements. Since the piping is above-ground and the skid is constructed of structural steel, should operational requirements of the metering station change, the skid as described herein allows for the interchangeability of the piping or equipment without excessive or unreasonable station downtime.

Once the fabrication schedule is finalized 607, welding procedure(s) are selected to meet applicable codes and customer specifications 609. More specifically, the typical welding code is followed for pipelines is API 1104 yet ASME Section IX can be utilized for shop fabrication. If required, existing welding procedures can be utilized however a fabricator may create its own customized procedures. Those skilled in the art will further recognize that welder qualifications used by the fabricator are performed as necessary to meet applicable codes and required specifications 211. If a welder qualification is required, the welder will complete a weld sample per applicable procedure. The weld is visually inspected per applicable code and customer specifications and is later tested in a non-destructive manner (e.g. X-ray) per applicable code and specifications. If no issues are found with the welder's performance and workmanship, the welder is qualified to the applicable procedure.

Thereafter, the various construction materials are received and inspected at fabrication shop 613 which are also inclusive of required documentation per applicable codes and required specifications. The piping is next fabricated 615, where a welding foreman will coordinate the dimensional layout of piping in the order of fabrication for best efficiency, ease of use and balance. The pipe welds are visually inspected throughout the fabrication process to ensure quality construction. This is typically done by a Certified Welding Inspector (CWI) representing the fabricator. During construction, the pipe welds are numbered and documented on a weld map included with the design. The pipe welds are nondestructively tested per applicable code and customer specifications. As noted herein, the structural steel design may include differing shapes and sizers for both the primary skid and secondary skids.

Following successful completion of pipe fabrication and weld inspection 617, pressure testing of piping is performed to meet applicable codes and customer specifications. In this process, the test mediums may include water, inert gas, or air which is often determined by applicable code and/or customer specifications. This process includes, using certified and calibrated testing equipment that is provided by fabricator per applicable code and customer specifications. Finally, qualified personnel of the fabricator execute the pressure test per the applicable code and customer specifications.

Once the fabricated structural steel skid frame received from skid builder 619, the skid frame and piping delivered to painting subcontractor 621 for application of paint per applicable codes and customer specifications. Following paint application, the piping is installed 623 onto structural steel skid frame at fabricator shop. A skid, with piping installed, is delivered 625 to the building installer for installation of regulator building and electrical components as required per the design. Due to the modular structural design of the building and roof frame, if in the future the station requires replacement of piping or equipment within the building, the roof can be easily detached from the building to allow for easy extraction of piping or equipment. As noted herein a lifting lug assembly may extend through the roof of the building. A skid, with piping, building and electrical installed, is delivered back to fabricator 627 for installation of instrumentation and tubing as required per design. A leak test of tubing is performed to ensure integrity of the welding and pipes after construction. A final inspection of completed regulator station skid is then performed. The final inspection includes but is not limited to a final touch-up painting and submission and review of applicable QA/QC documentation by the customer 629.

The skid mounted CNG metering and regulation station is then delivered to the customer 631. As the skid is constructed with structural steel, this results in a light weight skid apparatus weighing approximate 23,500 lbs (11.75 tons). In use, the skid utilizing transported and delivered using a medium-duty pick-up and 30-foot trailer. In view of the weight of the structural steel skid, round cylindrical concrete foundations such as SONOTUBE® foundations can be utilized for supporting the apparatus instead of using a full concrete footing and foundation wall. The skid and regulator building use one or more concrete sonotube foundations for supporting the CNG metering and regulation station in the ground at the site location. The structural foundation design for placement of the SONOTUBE foundations are based on presumptive load-bearing values of the soils and design weight of the pre-fabricated skid to account for the quantity and size of the SONOTUBE foundations.

Figure 7:
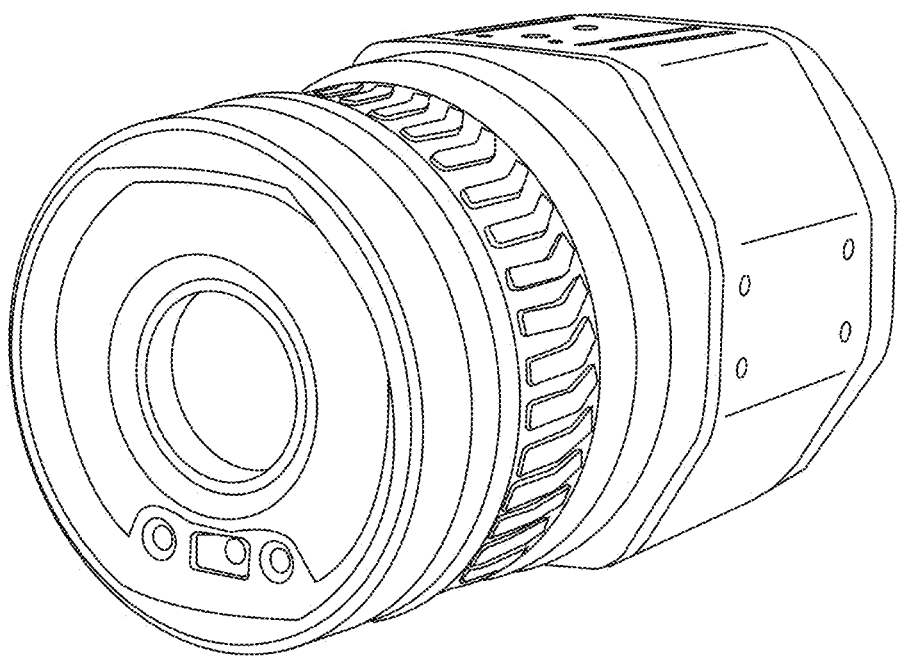
FIG. 7 illustrates a infra-red camera for providing visual gas leak detection in accordance with various embodiments of the invention.

FIG. 7 illustrates a infra-red camera 700 for providing visual gas leak detection in accordance with various embodiments of the invention. The camera 700 is typically attached to a clamping assembly as described herein.

Figure 8A:
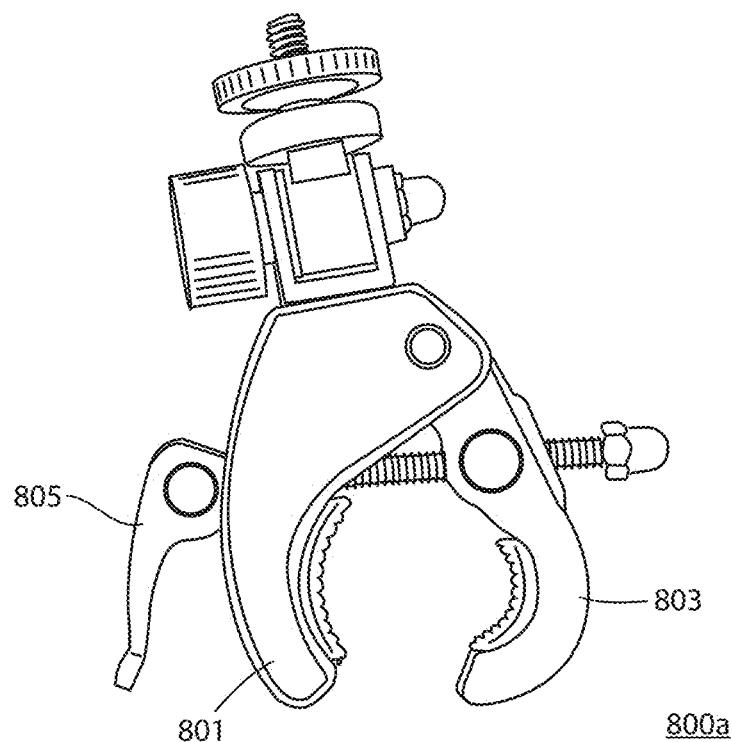
FIG. 8A and FIG. 8B illustrate a clamping assembly used to hold the IR camera to gas piping as used with various embodiments of the invention.
Figure 8B:
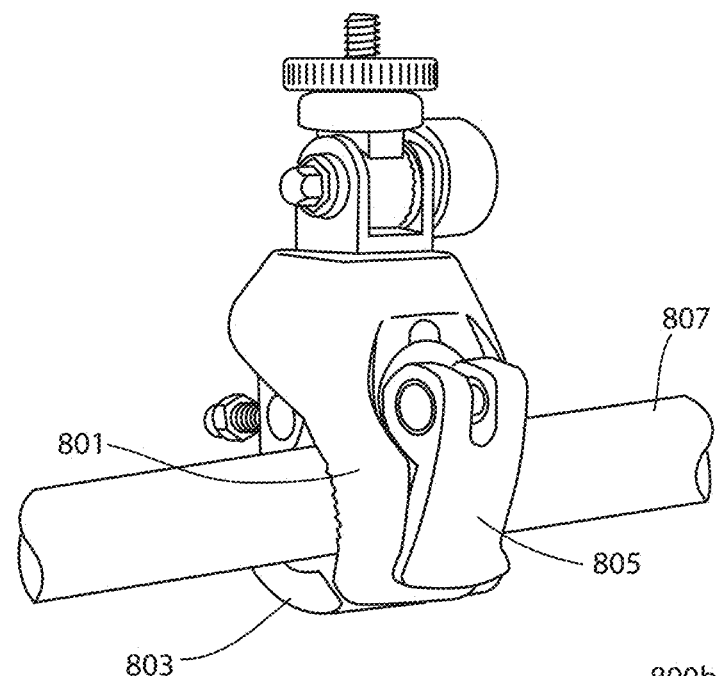

FIG. 8A and FIG. 8B illustrate a clamping assembly 800 used to hold the IR camera to gas piping as used with various embodiments of the invention. The clamping assembly 800 includes a first jaw 801 and second jaw 803. Jaws 801, 803 are used with a clamp 805 so claiming assembly 800 and camera 700 can be fixedly attached to a gas pipe 807.

Those skilled in the art will further recognize that the skid mounted CNG regulation station is manufactured in accordance with various codes and standards the meet national, state and local codes, standards and well as client specifications. Links to these standards are provided below, and are herein incorporated by reference in their entireties.

Mechanical
  Federal
    PART 192—Transportation of Natural and Other Gas by Pipeline: Minimum Federal Safety Standards
    https://www.ecfr.gov/cgi-bin/text-idx?tpl=/ecfr-browse/Title49/49cfr192_main_02.tpl
  State
    Michigan Gas Safety Standards Guide
    http://www.michigan.gov/documents/mpsc/GuideMGSS_23rd_599706_7.pdf
    American Petroleum Institute (API) Standard
    1104: *Welding Pipelines and Related Facilities*
    https://www.techstreet.com/api/standards/api-std-1104?product_id=1863960
    American Society of Mechanical Engineers (ASME) Standard
      *Section VIII: Rules for Construction of Pressure Vessels Division I*
      https://www.asme.org/shop/standards/new-releases/boiler-pressure-vessel-code
    Pipe Fabricators Institute (PFI) Standards
      http://pfi-institute.org/products
Civil
  American Concrete Institute (ACI)
    https://www.concrete.org/
  American Society of Testing Methods (ASTM)
    https://www.astm.org/
Electrical
  National Electrical Code (NEC) (NFPA 70)
    http://www.nfpa.org/codes-and-standards/all-codes-and-standards/list-of-codes-and-standards/detail-?code=70
  State
    *Michigan Gas Safety Standards Guide*
    http://www.michigan.gov/documents/mpsc/GuideMGSS_23rd_599706_7.pdf
Safety
  Federal
    *Occupational Safety and Health Association (OSHA)* 29-*CFR*-1926 *"Construction"*
    https://www.osha.gov/pls/oshaweb/owasrch.search_form?p_doc_type=STANDARDS&p_toc_level=1&p_ke
  State
    *Michigan Occupational Safety and Health Administration (MIOSHA)*
    http://www.michigan.gov/lara/0,4601,7-154-11407---,00.html In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A modular skid for use with a compressed natural gas (CNG) metering and regulation station comprising;
  a primary skid frame comprised with a first plurality of steel members;
  a secondary skid frame comprised of a second plurality of steel members orthogonally attached to the primary skid frame to form a substantially L-shape where the secondary skid frame is configurable into a linear shape using a plurality of brackets for allowing the secondary skid frame to releasably fasten to the primary skid frame forming a unitary skid assembly;
  a plurality of remotely controlled valves or regulating of the CNG;
  a first gas leak detector having at least two infra-red (IR) cameras that are configured to substantially face toward one another on the primary skid frame operating to alert a user of gas leakage and turn-off the remotely controlled valves; and
  a second gas leak detector having a ultra-violet (UV) light source and a UV detector both mounted to project UV light horizontally across the primary skid frame for detecting UV light attenuation in the presence of a CNG leak.

2. A modular skid as in claim 1, wherein the plurality of brackets extend orthogonally from at least one of the second plurality of steel members.

3. A modular skid as in claim 1, wherein accessory components of the metering and regulation station are mounted to the secondary skid frame.

4. A modular skid as in claim 3, wherein the accessory components are a heater unit.

5. A modular skid as in claim 1, further comprising a building having at least one lifting lug assembly extending therethrough for vertically lifting the metering and regulation station by a crane.

6. A compressed natural gas (CNG) metering and regulation station comprising:
- a primary skid frame comprised of a first plurality of steel members;
- a secondary skid frame comprising of a second plurality of steel members that are reconfigurable using brackets for attaching to the first plurality of steel members where the secondary skid frame is orthogonally attached to the primary skid frame to form a substantially L-shape;
- a building having a roof extending over the primary skid frame and secondary skid frame;
- a plurality of remotely controlled valves for regulating of the CNG;
- a first wireless gas leak detector having at least two infra-red (IR) cameras that are configured to face toward one another on the primary skid frame operating to provide an alert of gas leakage and turn-off the remotely controlled valves;
  - a second wireless gas leak detector having a ultra-violet (UV) light source and a UV detector both to project light horizontally across the primary skid frame for detecting UV light attenuation in the presence of a CNG leak; and
  - a plurality of lifting lug assemblies extending though a roof on the building for providing lifting points for the CNG metering and regulation station building.

7. A CNG metering and regulation station as in claim 6, wherein the lifting lug assembly including a trapezoidal shaped lifting lug.

8. A CNG metering and regulation station as in claim 6, wherein the second steel frame is used for attaching accessory components to the primary skid frame.

9. A CNG metering and regulation station as in claim 8, wherein the accessory component is a heating unit.

10. A CNG metering and regulation station as in claim 6, wherein the lifting lug assembly fastens to the ridge member in the roof.

11. A CNG metering and regulation station as in claim 4, wherein the lifting lug assembly includes an upper base and lower base for supporting the ridge member.

12. A method for fabricating a skid mounted compressed natural gas (CNG) metering and regulation station comprising the steps of:
- constructing a primary skid frame comprised of a first plurality of steel members;
- constructing a secondary skid frame comprising a second plurality of steel members where the second plurality of steel members are reconfigurable using at least one mounting bracket assembly for fastening the second plurality of steel members to the first plurality of steel members;
- orthogonally attaching the second plurality of steel member to the first plurality of steel members to form a substantially L-shape;
- providing a plurality of remotely controlled valves for regulating of the CNG;
  - configuring a first wireless gas leak detector system having at least two infra-red (IR) cameras that face toward one another on the primary skid frame operating to provide an alert of gas leakage, and a second gas leak detector system having a ultra-violet (UV) light source and a UV detector both mounted to project UV light horizontally across the skid frame for detecting light attenuation in the presence of a CNG leak so the first wireless gas leak detector and second wireless gas leak detector can turn-off the remotely controlled valves;
- constructing a building having a roof that extends over the primary skid frame and secondary skid frame; and
- configuring a plurality of lifting lug assemblies extending through the roof on the building for providing lifting points for the CNG metering and regulation station building.

13. A method for fabricating a skid mounted compressed natural gas (CNG) metering and regulation station as in claim 12, further comprising the step of:
attaching accessory components to the second steel frame.

14. A method for fabricating a skid mounted compressed natural gas (CNG) metering and regulation station as in claim 12, further comprising the step of:
utilizing a heating unit as the accessory component.

15. A method for fabricating a skid mounted compressed natural gas (CNG) metering and regulation station as in claim 12, further comprising the step of:
fastening the lifting lug assembly to the ridge member in the roof.

16. A method for fabricating a skid mounted compressed natural gas (CNG) metering and regulation station as in claim 15, further comprising the step of:
utilizing a lifting lug assembly having an upper base and a lower base for supporting the ridge member.

* * * * *